United States Patent [19]

Fujii et al.

[11] Patent Number: 6,144,973
[45] Date of Patent: Nov. 7, 2000

[54] DOCUMENT REQUESTING SYSTEM AND METHOD OF RECEIVING RELATED DOCUMENT IN ADVANCE

[75] Inventors: Hiroko Fujii, Tokyo; Shin-ya Amano, Yokohama; Masana Minami, Tokyo, all of Japan

[73] Assignee: Kabushiki Kaisha Toshiba, Kawasaki, Japan

[21] Appl. No.: 08/923,915

[22] Filed: Sep. 5, 1997

[30] Foreign Application Priority Data

Sep. 6, 1996  [JP]  Japan ................................ 8-236450

[51] Int. Cl.⁷ ........................................ G06F 17/30
[52] U.S. Cl. ........................ 707/501; 707/5; 707/100; 707/104
[58] Field of Search ................ 707/101, 102, 707/104, 501, 200, 500, 540, 3–6, 100

[56] References Cited

U.S. PATENT DOCUMENTS

| | | | |
|---|---|---|---|
| 5,418,948 | 5/1995 | Turtle | 707/4 |
| 5,694,594 | 12/1997 | Chang | 707/6 |
| 5,754,939 | 5/1998 | Herz et al. | 707/501 |
| 5,758,088 | 5/1998 | Bezaire et al. | 395/200.62 |
| 5,832,494 | 11/1998 | Egger et al. | 707/102 |
| 5,835,905 | 11/1998 | Pirolli et al. | 707/3 |
| 5,841,978 | 11/1998 | Rhoads | 709/217 |
| 5,862,260 | 1/1999 | Rhoads | 382/232 |
| 5,862,325 | 1/1999 | Reed et al. | 709/201 |
| 5,895,470 | 4/1999 | Pirolli et al. | 707/102 |
| 5,907,704 | 5/1999 | Gudmundson et al. | 395/701 |
| 5,926,812 | 7/1999 | Hilsenrath et al. | 707/5 |
| 5,943,669 | 8/1999 | Numata | 707/5 |

OTHER PUBLICATIONS

Savoy, Jacques, "A new probabilistic scheme for information retrieval in hypertext", The New Review of Hypermedia and multimedia: Applications and Research, vol. 1, 1995, Material ID No.: F105–96001, pp. 107–134.

Ken–ichi Chinen & Suguru Yamaguchi: The Feasibility and Performance Studies on Prefetching Technique in the WWW Platform; Nov. 7, 1996; (Japan Internet Conference 96).

*Primary Examiner*—Hosain T. Alam
*Assistant Examiner*—Shahid Alam
*Attorney, Agent, or Firm*—Banner & Witcoff, Ltd.

[57] ABSTRACT

The degree of association between each document specified by each of the URLs included in the document transferred from a document providing system to a document requesting system and the document specified by the preceding document request is determined on the basis of the depth of link between the document specified by the preceding document request and each document specified by each URL or the degree of similarity between the contents of those documents. Using the thus obtained degree of association, a document to be received in advance is specified in the document requesting system. Consequently, even when a document having a lot of URLs is requested first or when each of the documents requested as related documents further includes a URL specifying another document, the document requesting system can specify documents closely related to the first requested document.

4 Claims, 8 Drawing Sheets

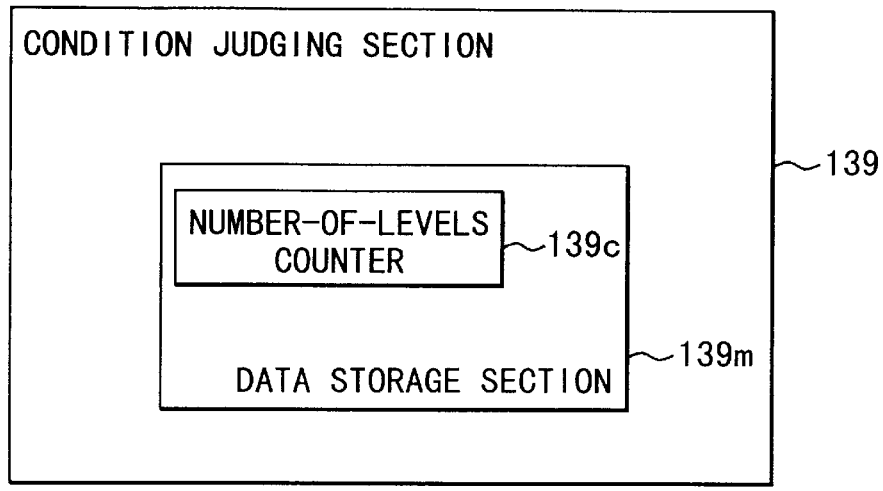
F I G. 6
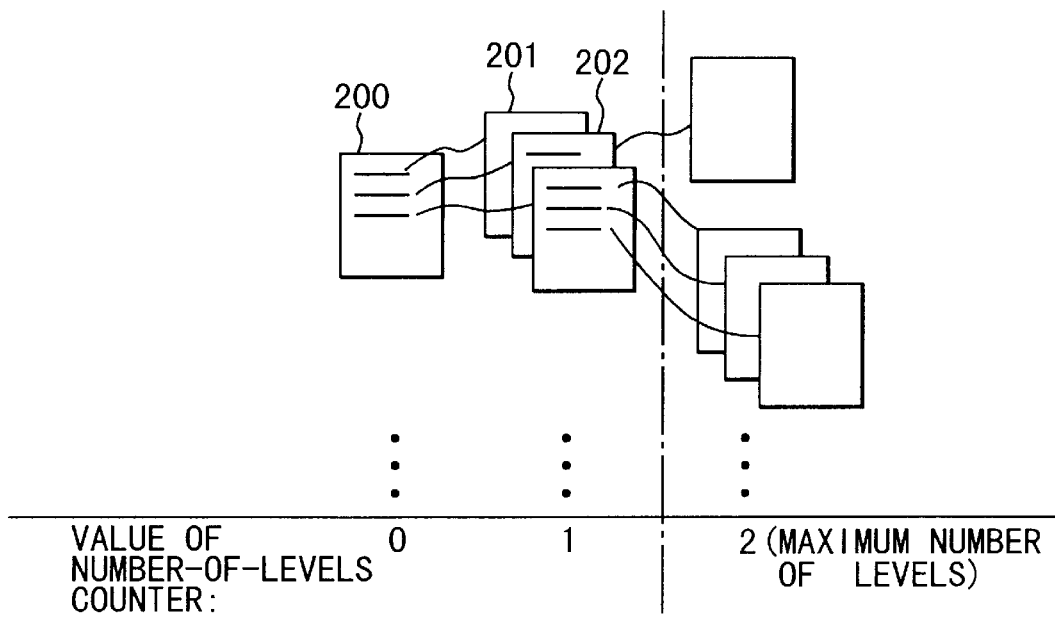
F I G. 7

DOCUMENT REQUESTING SYSTEM AND METHOD OF RECEIVING RELATED DOCUMENT IN ADVANCE

BACKGROUND OF THE INVENTION

The present invention relates to a document requesting system that requests a document providing system to transfer a document, and more particularly to a document requesting system that receives not only the requested document but also related documents in advance from a document providing system.

In recent years, the WWW (World Wide Web) has been widely known as a system that causes servers to provide various types of electronic information to clients through a network. The system, as shown in FIG. 1, comprises a WWW server 11 and a WWW client 12, for example. The server 11 provides document information to the client 12 via communication sections 21, 22 according to a predetermined file transfer protocol HTTP (HyperText Transfer Protocol) between the server 11 and the client 12. The spread of the WWW enables access to document information all over the world through the network.

In the system, the transfer of document files from a server to a client is basically carried out one by one. Specifically, when the user requires the display of a document, the WWW client communicates with the WWW server, which transfers the document to the WWW client, which then displays the document on the screen. To display another document, the same operation is performed again. Thus, WWW is based on the assumption that it is used only on-line.

Accordingly, to acquire information through WWW using a portable data terminal, such as a notebook computer or a PDA (Personal Digital Assistance), the portable data terminal must be connected to the network until the use of WWW is finished. Since such a portable data terminal is not always used under the conditions where it can be constantly connected to the network, it is needed to automatically download as much information as possible all at once into the portable data terminal during the connection to the network so that the contents of the information can be read even after the disconnection from the network.

One method of realizing this is a method of causing the server to transfer not only the document the user has requested to be transferred but also related documents to the client.

This approach enables the user to cause the server to transfer a plurality of documents to the client by one instruction without directing the transfer of each document. The transferred documents are stored in the client's storage medium. Specifically, the approach is based on a method of starting a program that transfers a plurality of documents according to a transfer request made by the user and storing them in the client's storage medium or a method of concatenating a plurality of documents into a single document in advance and storing the concatenated document in the client's storage medium. The approach, however, has the following problem.

When a document is requested, documents determined to be related documents must be determined beforehand on the server side. This requires the process of preparing a document list indicating related documents on the server side and sending the list to the client.

Consequently, a judgment as to which documents are related documents is entirely up to the document provider and therefore related documents cannot be specified on the client side.

BRIEF SUMMARY OF THE INVENTION

Accordingly, it is an object of the present invention to provide a document requesting system that enables the client side to specify documents to be received in advance as related documents and is capable of receiving suitable related documents in advance only with the functions of the client and a method of receiving related documents in advance.

According to one aspect of the present invention, there is provided a document requesting system for requesting the transfer of related documents to be received in advance, comprising: means for extracting from a first document transferred by request an identifier specifying a second document linked to the first document; and means for determining the degree of association between the second document specified by the extracted identifier and a predetermined document as a reference, the second document being determined to be one of the related documents in the case where the degree of association is larger than a specific degree of association.

According to another aspect of the present invention, there is provided a client unit for requesting a server unit to transfer of related documents to be received in advance which are written in HTML (HyperText Markup Language) form, comprising: means for extracting from a first document transferred by request from the server unit a URL (Uniform Resource Locator) an identifier specifying a second document linked to the first document; and means for determining the degree of association between the second document specified by the extracted URL and a predetermined document as a reference, the second document being determined to be one of the related documents in the case where the degree of association is larger than a specific degree of association.

According to another aspect of the present invention, there is provided a document requesting system for requesting the transfer of related documents to be received in advance, comprising: means for extracting from a first document transferred by request an identifier specifying a second document linked to the first document; means for determining the depth of link between the second document specified by the extracted identifier and a predetermined document as a reference, the second document being determined to be one of the related documents in the case where the depth of link is smaller than a specific value; and means for requesting the transfer of the second document in the case where the depth of link is smaller than the specific value.

In this system, the determining means may include a number-of-levels counter which counts the number of levels that indicates what level of hierarchy the second document falls from the predetermined document as the reference. In this case, the second document is determined to be one of the related documents in the case where the number of levels indicated by the number-of-levels counter is smaller than a specific value.

According to another aspect of the present invention, there is provided a document requesting system for requesting the transfer of related documents to be received in advance, comprising: means for extracting from a first document transferred by request an identifier specifying a second document linked to the first document; means for requesting the transfer of the second document specified by the extracted identifier; and means for determining the degree of similarity between the second document transferred by request and a predetermined document as a reference, the second document being determined to be one of the related documents in the case where the degree of similarity is larger than a specific value.

In this system, the determining means may include means for calculating the percentage of common or similar words between the second document and the predetermined document as the reference. In this case, the second document is determined to be one of the related documents in the case where the percentage indicated by the calculating means is larger than a specific value.

According to another aspect of the present invention, there is provided a method of receiving related documents in advance for use in a document requesting system for requesting the transfer of the related documents, the method comprising the steps of: extracting from a first document transferred by request an identifier specifying a second document linked to the first document; and determining the degree of association between the second document specified by the extracted identifier and a predetermined document as a reference, the second document being determined to be one of the related documents in the case where the degree of association is larger than a specific degree of association.

According to another aspect of the present invention, there is provided a method of receiving related documents in advance which are written in HTML (HyperText Markup Language) form, for use in a document requesting system for requesting the transfer of the related documents, the method comprising the steps of: extracting from a first document transferred by request from the server unit a URL (Uniform Resource Locator) an identifier specifying a second document linked to the first document; and determining the degree of association between the second document specified by the extracted URL and a predetermined document as a reference, the second document being determined to be one of the related documents in the case where the degree of association is larger than a specific degree of association.

According to another aspect of the present invention, there is provided a method of receiving related documents in advance for use in a document requesting system for requesting the transfer of the related documents, the method comprising the steps of: extracting from a first document transferred by request an identifier specifying a second document linked to the first document; determining the depth of link between the second document specified by the extracted identifier and a predetermined document as a reference, the second document being determined to be one of the related documents in the case where the depth of link is smaller than a specific value; and requesting the transfer of the second document in the case where the depth of link is smaller than the specific value.

In this method, the determining step may include the step of counting the number of levels that indicates what level of hierarchy the second document falls from the predetermined document as the reference. In this case, the second document is determined to be one of the related documents in the case where the number of levels indicated by the number-of-levels counter is smaller than a specific value.

According to another aspect of the present invention, there is provided a method of receiving related documents in advance for use in a document requesting system for requesting the transfer of the related documents, the method comprising the steps of: extracting from a first document transferred by request an identifier specifying a second document linked to the first document; requesting the transfer of the second document specified by the extracted identifier; and determining the degree of similarity between the second document transferred by request and a predetermined document as a reference, the second document being determined to be one of the related documents in the case where the degree of similarity is larger than a specific value.

In this method, the determining step may include the step of calculating the percentage of common or similar words between the second document and the predetermined document as the reference. In this case, the second document is determined to be one of the related documents in the case where the percentage obtained by the calculating step is larger than a specific value.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 6 shows an example of the condition judging section with a data storage section having a number-of-levels counter used in the system of FIG. 2;

FIG. 7 is a drawing to help explain the relationship between the levels of hierarchy of documents and the number-of-levels counter value;

DETAILED DESCRIPTION OF THE INVENTION

Before a detail explanation of an embodiment of the present invention, the basic idea of the invention will be briefed to make it easier to understand the invention.

With this document requesting system, on the basis of the degree of association between the document specified by the identifier included in the transferred document and the first transferred document, it is judged whether or not the document specified by the identifier can be a related document to be received in advance. This enables the document requesting system side to specify a related document that can be received in advance. The degree of association can be determined on the basis of the depth of the link between the document specified by the first request and the document specified by the identifier or on the basis of the degree of similarity between the contents of documents.

Therefore, even when a document with many identifiers is first requested or when the document requested as a related document further includes an identifier, the document requesting system side can specify any document closely related to the first requested one of the many documents specified by those identifiers. By use of WWW, this makes it possible to receive a suitable related document in advance using only the function of a browser acting as a WWW client without changes in a WWW server.

Hereinafter, referring to the accompanying drawings, an embodiment of the present invention will be explained in detail.

Figure 2:
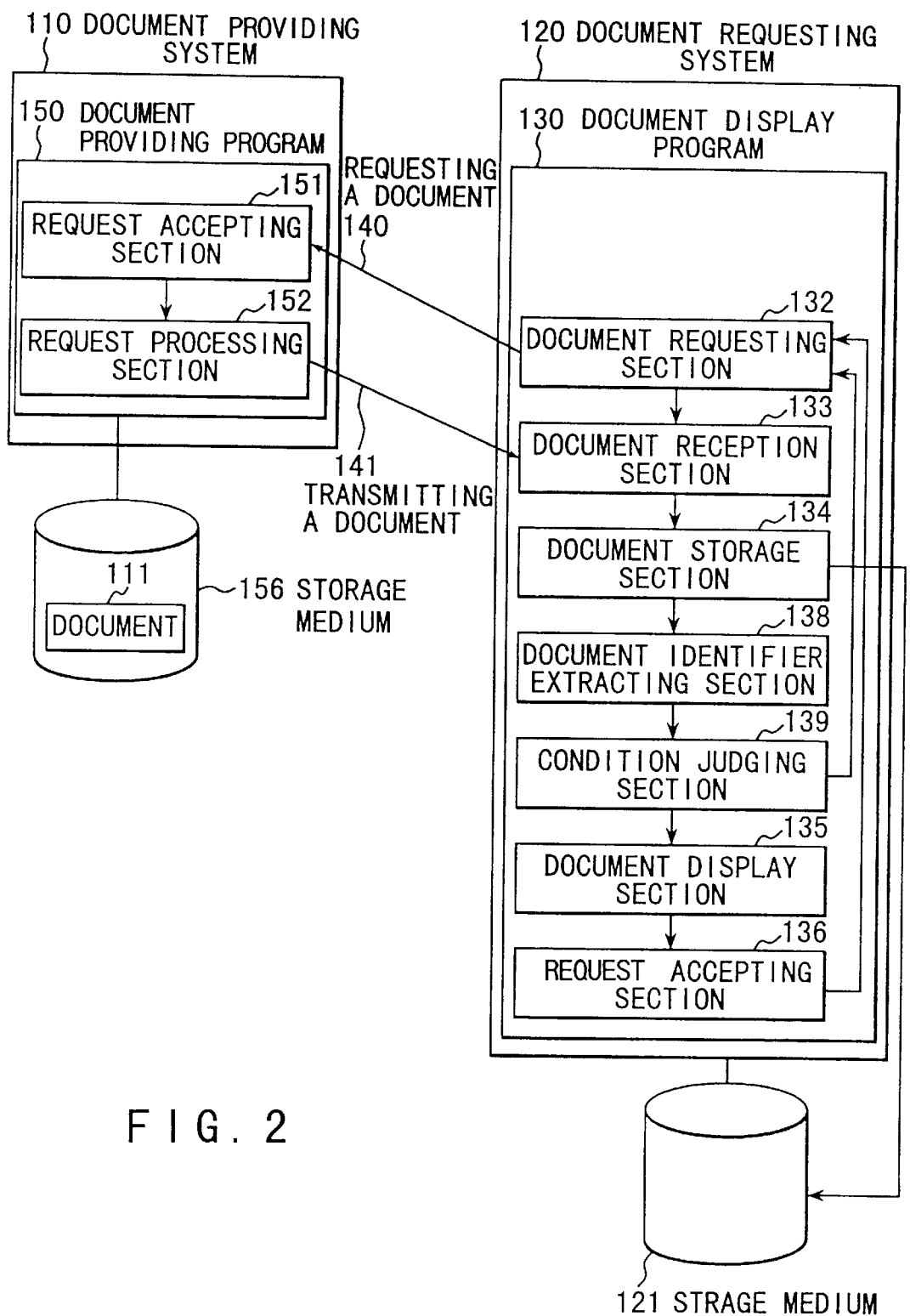
FIG. 2 is a block diagram of the configuration of a client/server system including a document requesting system according to an embodiment of the present invention.

FIG. 2 shows a data communication system to which a file reading method according to the embodiment of the present invention is applied and the organization of the functions of programs used in the system. The data communication system is, for example, a client/server system that provides various document files (including HTML hypertext, still pictures, moving pictures, and voice), making use of a network environment, such as the Internet, and comprises a document providing system 110 which functions as a WWW server that provides document files and a document requesting system 120 which functions as a WWW client that requests a document file.

Figure 1:
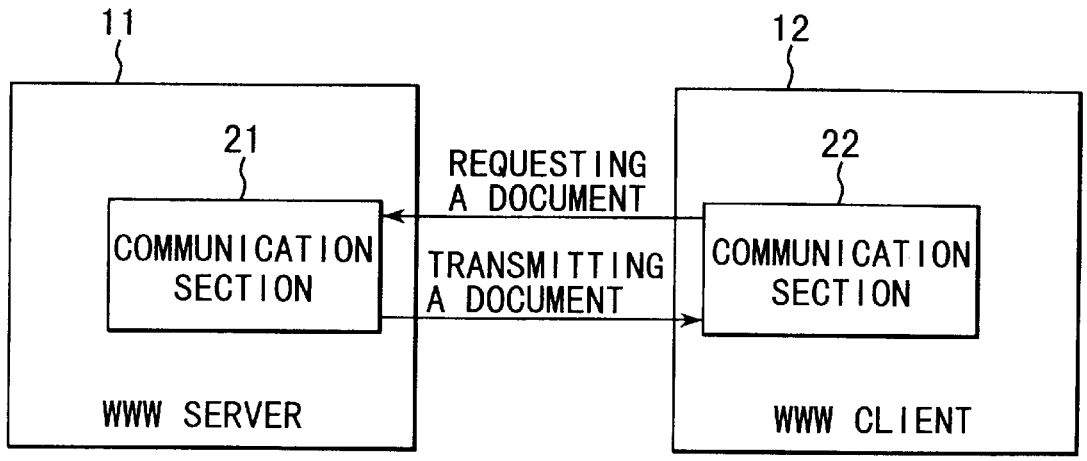
FIG. 1 is a block diagram to help explain a document request/document transmission carried out between a server and a client.

In the document providing system 110, a document providing program 150 includes a request accepting section 151 and a request processing section 152 is in operation. The request accepting section 151 accepts a request from a document display program 130 that is in operation in the document requesting system 120. The request processing section 152 performs concrete processes according to the request accepted at the request accepting section 151. For example, the request processing section 152 searches a storage medium 156 for a document 111 corresponding to the request accepted at the request accepting section 151. If having found the corresponding document, it transmits the document to the document requesting system 120. Although not shown in FIG. 2, the requesting of a document and the transmission of a document between the document providing program 150 and the document display program 130 are carried out via communication sections 21, 22 in the form of hardware as shown in FIG. 1.

In the document requesting system 120, the document display program 130 is in operation which includes a document requesting section 132, a document reception section 133, a document storage section 134, a document identifier extracting section 138, a condition judging section 139, a document display section 135, and a request accepting section 136.

The document requesting section 132 requests the document providing system 110 to provide a document. The document reception section 133 receives the document provided by the document providing system 110.

The document storage section 134 stores the document received from the document providing system 110 into the storage medium 121. The document identifier extracting section 138 analyzes the document received at the document reception section 133 and extracts a document identifier.

The condition judging section 139 is a program that judges whether or not the document corresponding to the identifier extracted at the document identifier extracting section 138 is a document file to be received in advance, on the basis of the degree of association (explained later) between the document specified by the identifier and the first requested document.

The document display section 135 displays the requested document. The request accepting section 136 accepts a request. The document display program 130 is not necessarily a single program, but may be made up of more than one program.

Figure 3:
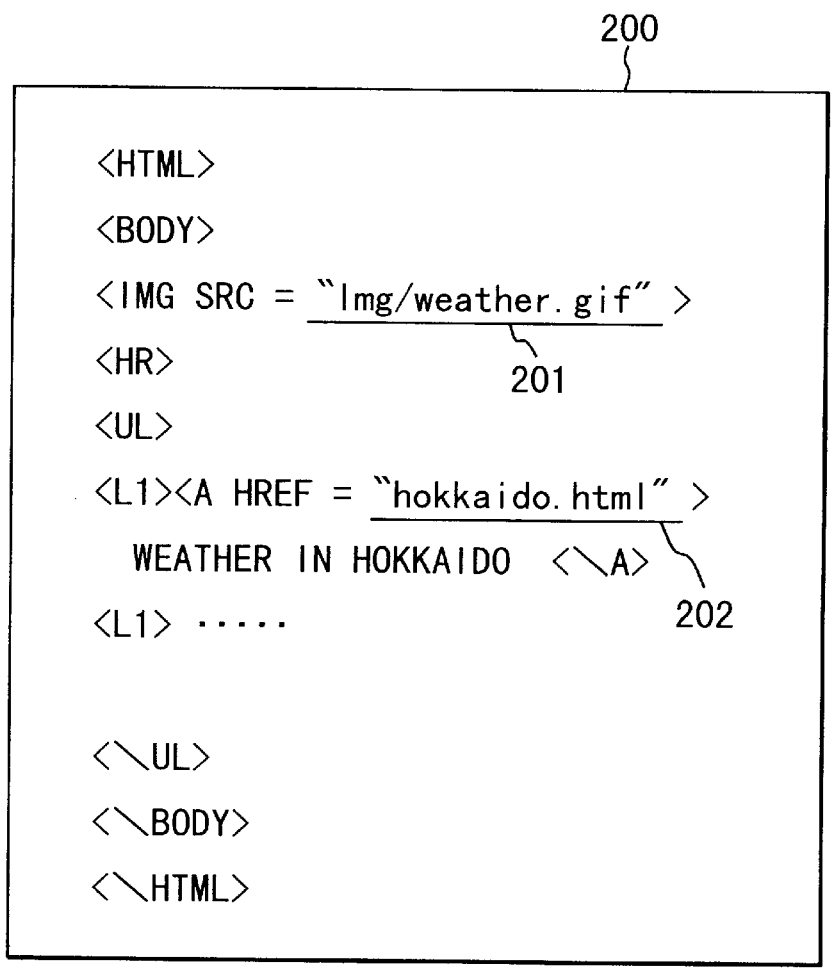
FIG. 3 shows a description of a document used in the system of FIG. 2.

FIG. 3 shows a description of the requested document. In the example of FIG. 3, a document 200 is written in HTML form (HyperText Markup Language) and includes URLs (Uniform Resource Locators) 201, 202 as identifiers for identifying documents. A URL is an identifier for determining the location of a document uniquely and takes the form of "<scheme>:<scheme-specific-part>". For example, it is expressed as "http://www.toshiba.co.jp/index.html". In the description, "http" means that http is used as a protocol for transmission and "//www.toshiba.co.jp/index.html" indicates the file "index.htm" in the host "www.toshiba.co.jp". The document identifier extracting section 138 in the document requesting system 120 extracts such URLs as 201 and 202 from the received document 200.

Figure 4:
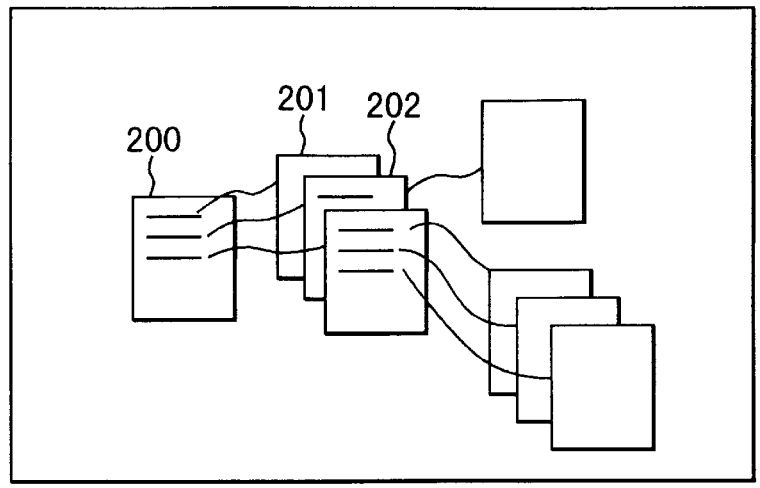
FIG. 4 is a drawing to help explain the link between documents in the system of FIG. 2.

For reference, all the links including the link between the document 200 and the documents 201, 202, are shown in FIG. 4.

Figure 5:
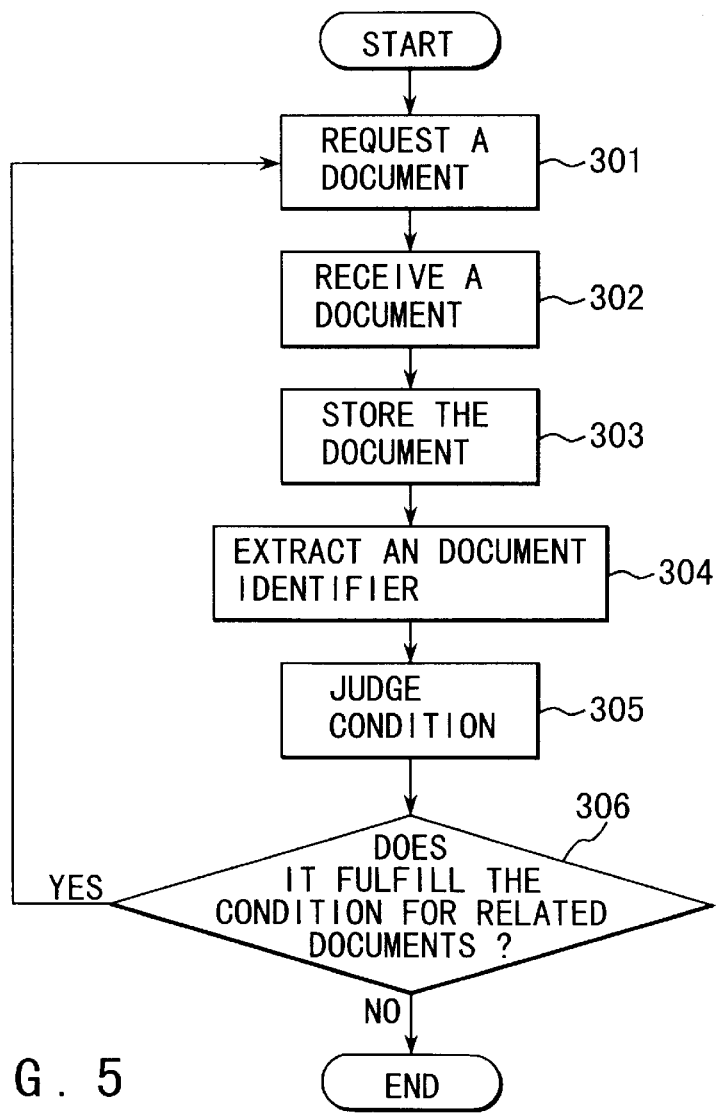
FIG. 5 is a flowchart for the procedures of a related document judging process and requesting process in the system of FIG. 2.

FIG. 5 shows the flow of the process of judging and requesting related documents in the document requesting system 120 associated with the present invention.

In the document requesting system 120, the document requesting section 132 requests a document (step S301). When the document reception section 133 have received the document corresponding to the request (step S302), the document storage section 134 stores the document into the storage medium 121 of the document requesting system 120 (step S303). Next, the document identifier extracting section 138 extracts a document identifier included in the document (step S304).

Then, the document specified by the identifier extracted at the document identifier extracting section 138 is considered to be a related document. The condition judging section 139 judges whether to request the document from the document providing system 110 (step S305). Thereafter, a check is made to see if the judgment result from the condition judging section 139 fulfills a predetermined condition (step S306). If it meets the condition, the document requesting section 132 will request the corresponding document from the document providing system 110 according to the identifier extracted at the document identifier extracting section 138.

Next, an example of a concrete condition judging method used in the condition judging section 139 of the document display program 130 will be explained.

As shown in FIG. 6, a number-of-levels counter 139c for counting the number of levels of hierarchy of a document is provided in part of a data storage section 139m provided in the condition judging section 139. Use of the number-of-levels counter 139c makes it possible to judge whether the level of hierarchy of the document at the link destination of a document is higher or lower than a specific level of hierarchy. If it is lower than the specific level of hierarchy, a document at the link destination is requested. The repetition of this process will enable the related documents to be received in advance.

Specifically, the number-of-levels counter 139c presents the depth of the link of document A, when the first requested document K (the document that is currently searching for a related document) is used as a reference. For example, when URL indicating document A is included in the first requested document K, the value of the number-of-levels counter 139c is 1. In the example of FIG. 7, the documents corresponding to 201 and 202 are documents one level higher in hierarchy than document 200 and their number of levels is 1. If the document corresponding to 202 includes a URL, the number of levels of the document corresponding to the URL will be 2. For instance, if the maximum number of levels is set at 2, a document for which the value of the number-of-levels counter 139c is 2 will be called, but a document for which the value of the number-of-levels counter 139c is 3 will be not called.

Figure 8:
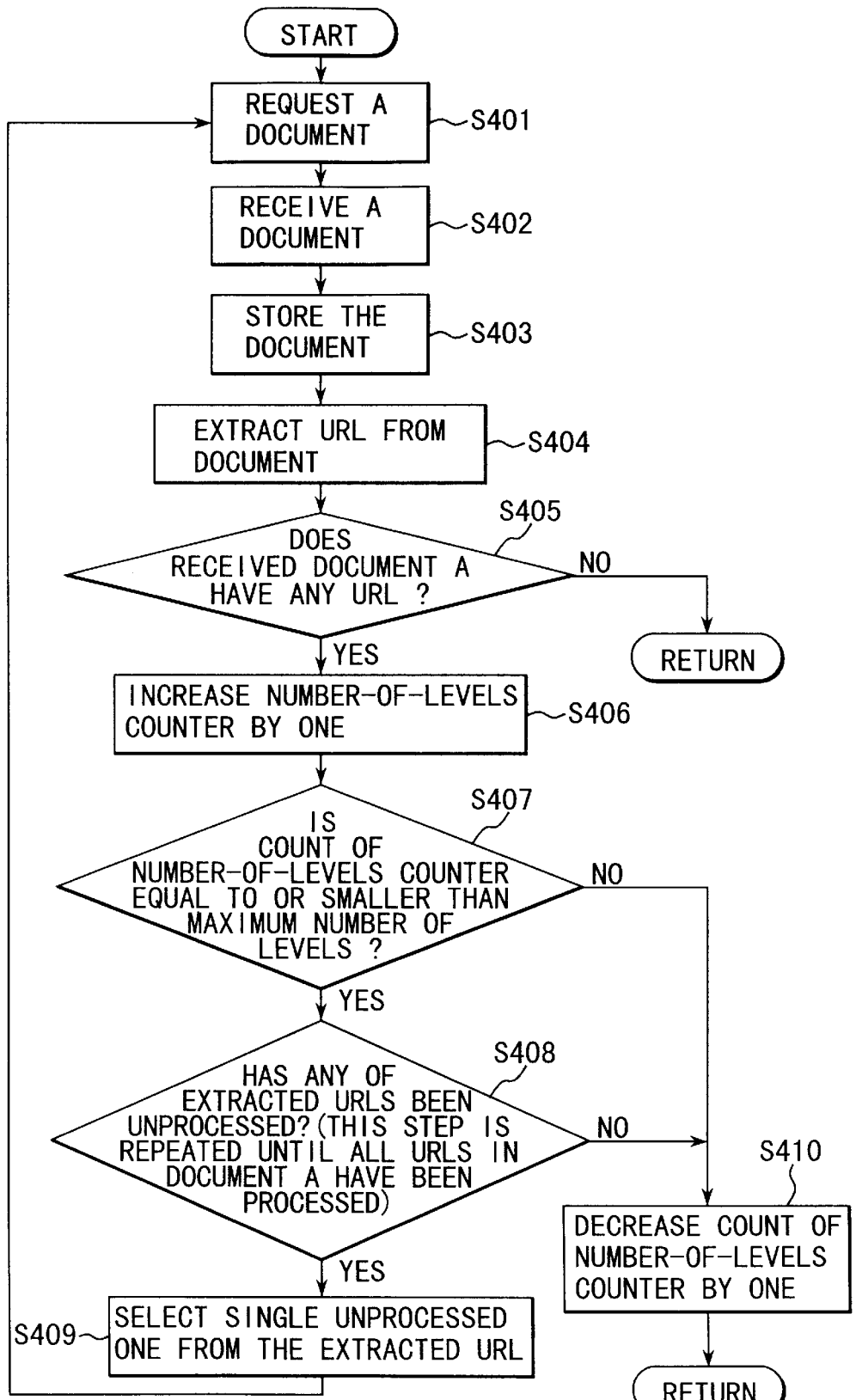
FIG. 8 is a flowchart of the procedure for the processing at the condition judging section in the system of FIG. 2.

FIG. 8 is a flowchart for a condition judging method used in the condition judging section 139 of the document display program 130.

In this example, as a method of specifying related documents, the processes are repeatedly carried out in which each of URLs included in a document transmitted in response to a document request is searched and another request for a document corresponding to the URL is transferred to the providing system 110. Note that the search for URLs in each of the documents may be recursively executed.

The flowchart of FIG. 8 shows the flow starting from when the document requesting section 132 requests a document. The process at the condition judging section 139 corresponds to the processes at step S405 and later.

In the document display program 130, the document requesting section 132 requests a document (step S401). The document reception section 133 receives the requested document (step S402). The document storage section 134 stores the received document into the storage medium 121 of the document requesting system 120 (step S403) and thereafter the document identifier extracting section 138 extracts a URL from the received document A (step S404).

Next, regarding document A, the condition judging section 139 of the document requesting system 120 judges the condition for specifying a related document as follows.

As a result of URL extraction at the document identifier extracting section 138, a check is made to see if any URL is included in document A (step S405). If a URL is included, the number-of-levels counter 139c is increased by one (step S406).

Next, the value of the number-of-levels counter 139c is compared with the predetermined maximum number of levels of hierarchy (step S407). When the value of the number-of-levels counter 139c is larger than the maximum number of levels, the value of the number-of-levels counter 139c is decreased by one (step S410) and the processing of document A is ended. Then, the remaining processes from step S408 are performed on document K which is the parent of document A.

When the result of comparison with document A at step S407 has shown that the value of the number-of-levels counter 139c is equal to or smaller than the maximum number of levels, the processes from step S401 are performed recursively on all of the URLs extracted at step S404 through the processes from step S408 explained later. By removing the already requested ones of the URLs extracted at step S404 from the objects to be processed, link loops can be dealt with.

The processes from step S408 are as follows. A check is made to see if any of the URLs extracted at step S404 has not requested a corresponding document yet (step S408). If any of the URLs has not requested a document yet, one URL that has not requested a document is selected (step S409) and the processes at step 401 and later are performed on the URL.

Specifically, at step S401, document B corresponding to the selected URL is requested. When a URL is included in document B at step S405 and the comparison at step S407 has shown that the value of the number-of-levels counter 139c is equal to or smaller than the maximum number of levels, the ones that have not required a document yet are taken out of the URLs extracted from document B at step S409. Then, the processes at step S401 and later are performed on them. When it has been judged at step S405 that no URL is included in document B, the processing of document B will be terminated and a return is made to the processing of document A. When the value of the number-of-levels counter 139c is larger than the maximum value at step S407 or when all of the URLs extracted from document B have been processed at step S408, the value of the number-of-levels counter 139c is decreased by one and the processing of document B is ended. Then, a return is made to the processing of document A.

As described above, a judgment is made to specify the related documents by determining the depth of link between each of the documents specified by URLs and the first requested document, thereby making it possible to selectively receive only documents with high degree of association in advance.

Figure 9:
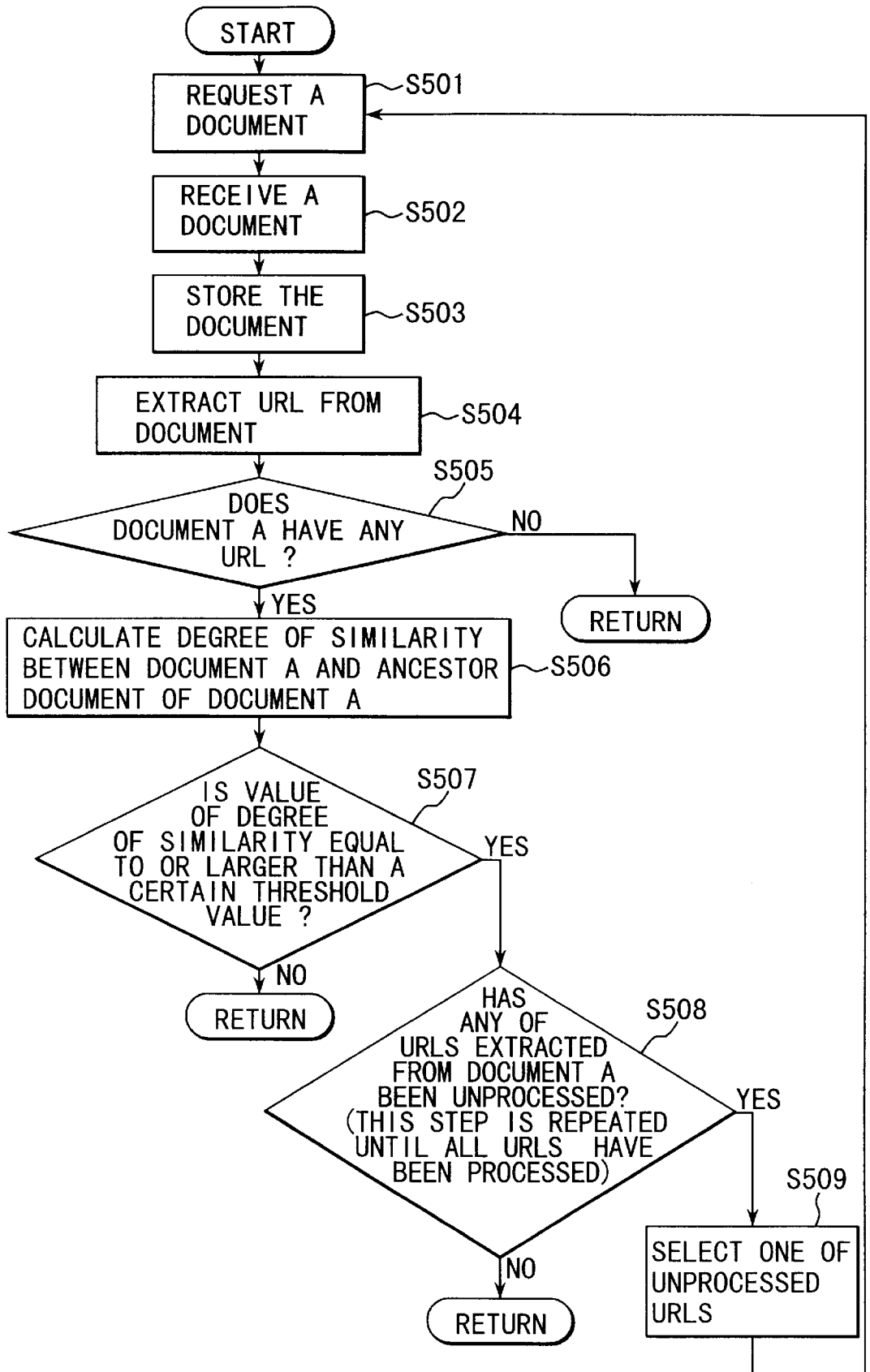
FIG. 9 is a flowchart of another procedure for the processing at the condition judging section in the system of FIG. 2.

FIG. 9 is another flowchart for a condition judging method used in the condition judging section 139 of the document display program 130.

In this example, as a method of specifying a related document, the degree of similarity between document A transmitted in response to a request for a document and its ancestor document (a specifying document having the URL that specifies document A, a document one step precedent to the specifying document, a document corresponding to the document K which has been first requested, or the like) is used. The flowchart of FIG. 9 shows the flow starting from when the document requesting section requests a document. The process of judging conditions corresponds to the processes at step S505 and later.

In the document display program 130, the document requesting section 132 requests a document (step S501). The document reception section 133 receives the requested document (step S502). The document storage section 134 stores the received document into the storage medium 121 of the document requesting unit 120 (step S503) and thereafter the document identifier extracting section 138 extracts a URL from the received document A (step S504).

Next, regarding document A, the condition judging section 139 of the document requesting system 120 judges the conditions for specifying related documents as follows.

As a result of URL extraction at the document identifier extracting section 138, a check is made to see if any URL is included in document A (step S505). If a URL is included, the degree of similarity between document A and an ancestor document of document A is calculated (step S506) and the calculated degree of similarity is compared with a predetermined threshold value (step S507).

When the degree of similarity calculated at step S506 is equal to or larger than the predetermined threshold value, that is, in the case where the document A is determined to be the related document, it is considered that all documents specified by the extracted URLs should be received in advance. In this case, a check is made to see if any of the URLs extracted at step S504 has not requested a document yet (step S508).

If some of the URLs have not requested a document yet, one URL that has not requested a document yet is selected and a return is made to step S501, where a request is made for the document corresponding to the selected URL. Accordingly, when the calculated degree of similarity is equal to or larger than the predetermined threshold value, the processes at step S501, where a document is requested, and subsequent steps are performed recursively on the all of the URLs extracted at the document identifier extracting section 138.

A concrete example of a method of calculating the degree of similarity in FIG. 9 will be described.

Figure 10:
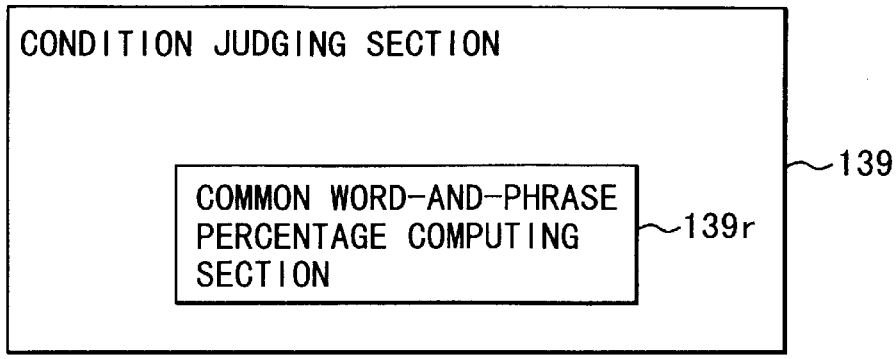
FIG. 10 shows an example of the condition judging section with a common words and phrases percentage computing section used in the system of FIG. 2.

As shown in FIG. 10, a common word-and-phrase percentage computing section 139r is provided in the condition judging section 139. The common word-and-phrase percentage computing section 139r is provided to realize an approach for judging the degree of similarity and calculates the percentage of words common to documents.

Figure 11:
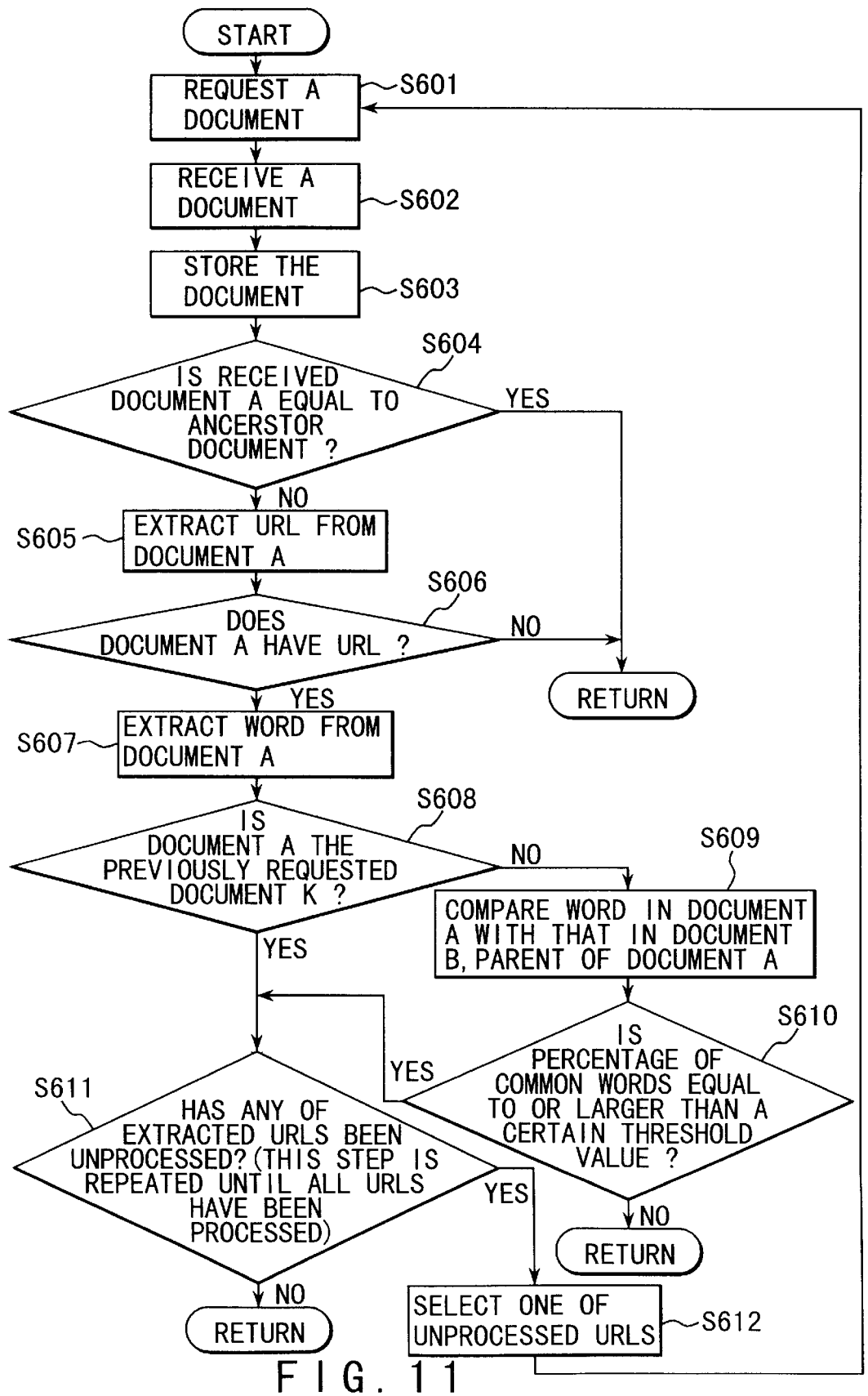
FIG. 11 is a flowchart of another procedure for the processing at the condition judging section in the system of FIG. 2.

FIG. 11 is a flowchart for a method of calculating the degree of similarity.

In the example, the degree of similarity is calculated using the groups of words appearing in the requested document A and the document B received immediately before document A and it is judged whether or not document A is a related document. The flowchart of FIG. 11 shows the flow starting from when the document requesting section requests a document.

In the document display program 130, the document requesting section 132 requests a document (step S601). The document reception section 133 receives the requested document (step S602). The document storage section 134 stores the received document into the storage medium 121 of the document requesting unit 120 (step S603).

Next, a check is made to see if the received document A is equal to an ancestor document (step S604). If document A is different from an ancestor document, the document identifier extracting section 138 extracts a URL from the received document A (step S605).

Next, regarding document A, the condition judging section 139 of the document requesting system 120 judges the conditions for specifying related documents as follows.

As a result of URL extraction at step S605, a check is made to see if any URL is included in document A (step S606). If a URL is included, a word is extracted from document A (step S607).

Next, a check is made to see if document A is the document K the user has requested (step S608). This is done by comparing the URL of document A with that of document K. If document A differs from document k, document A can be considered to be the document that the document requesting system 120 has requested as a related document of document K. Therefore, it is judged whether or not the document corresponding to the URL included in document A is determined to be a related document of document K.

Specifically, taking into account only a specific part of speech (a group of specific parts of speech), the common word-and-phrase percentage computing section 139r calculates the percentage of words in the part of speech (or the group of parts of speech) common to document A and document B which is the parent of document A (step S609). Next, the percentage of the common words in the part of speech (or the group of parts of speech) is compared with the predetermined threshold value (step S610).

When the content by percentage of the common words in the part of speech (or the group of parts of speech) is equal to or larger than the threshold value, or when it is found at step S608 that document A is document K that the user has requested, a check is made to see if any of the URLs extracted at step S605 has not requested a document yet (step S611).

If some of the URLs have not requested a document, one URL that has not requested a document yet is selected (step S612) and a return is made to step S601, where a request is made for the document corresponding to the selected URL. Accordingly, when the content by percentage of the common words in the part of speech (or the group of parts of speech) is equal to or larger than the threshold value, or when it is found that document A is document K that the user has requested, the processes at step S601 and later are performed recursively on the all of the URLs extracted at the document identifier extracting section 138.

Some of documents provided through WWW have a structure where links form a loop (in such a manner that a link is traced from a certain document S and reference is made again to document S). At step S604, a loop-structure link is sensed. In the process of specifying a related document of a certain document, the documents already judged by the condition judging section are prevented from being judged again.

The calculation of the degree of similarity using words in the document at step S609 is not restricted to the content by percentage of the common words in the specific part of speech (or the group of specific parts of speech), but may be made in other methods. For instance, synonyms may be regarded as an element for calculating the degree of similarity. In this case, when word W or its synonym W' included in document A at step S609 coincides with word X or its synonym X', the word is also regarded as a common word. With this consideration, the percentage of words common to both documents is calculated. It is assumed that synonyms are defined in a collection of synonyms determined independently.

Furthermore, a high-order word and low-order word of a word may be regarded as an element for calculating the degree of similarity. In this case, when at step S609, word W or its high-order word or low-order word W' included in document A coincides with word X or its high-order word or low-order word X', the word is also regarded as a common word. With this consideration, the percentage of words common to both documents is calculated. It is assumed that the high-order words and low-order words are defined in a thesaurus determined independently.

Furthermore, the degree of similarity may be calculated using any combination of all of these words, synonyms, and high-order words and low-order words.

The degree of similarity may be calculated in a different method from the method of finding the degree of similarity on a word basis explained in the embodiment. For instance, by analyzing the construction of sentences and meanings and extracting the meaning of a document, the degree of similarity between the documents can be calculated.

Moreover, any combination of all of the condition judging methods described above may be used as another judging method.

Figure 12:
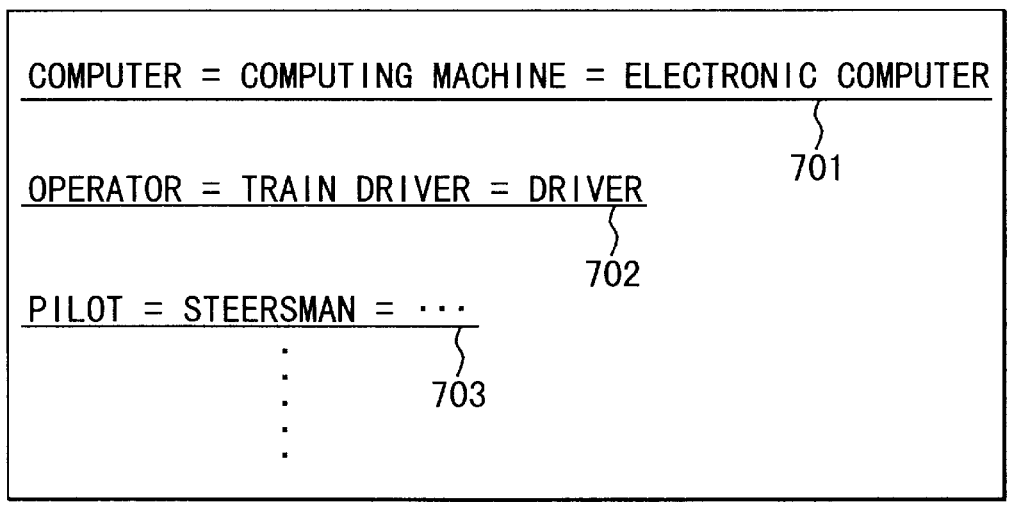
FIG. 12 shows an example of a collection of synonyms used in the system of FIG. 2.

FIG. 12 shows an example of a collection of synonyms. In the collection of synonyms shown in FIG. 12, each of numerals 701, 702, and 703 defines words regarded as common words in a manner that sets them apart by "=". For example, by numeral 701, the word "computer", the word "computing machine", and the word "electronic computer" are all defined as common words.

Figure 13:
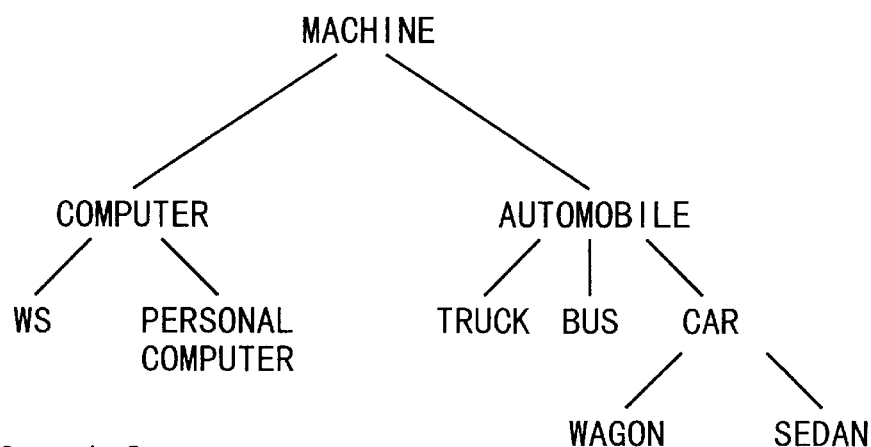
FIG. 13 shows an example of a thesaurus used in the system of FIG. 2.

FIG. 13 shows an example of a thesaurus. A thesaurus has words arranged hierarchically in a conceptual manner. In FIG. 13, regarding the word "machine", words with lower-order concepts in meaning are defined hierarchically.

As described so far, with the embodiment, the degree of association between each document specified by the URL included in the transferred document and the document specified by the first document request is determined on the basis of the depth of the link between the document specified by the first document request and each document specified by the URL or the degree of similarity between the contents of documents. The thus obtained degree of association is used to specify a document file to be received in advance. Therefore, even when a document having a lot of URLs is requested first or when each of the documents requested as related documents further has a URL specifying another document, the document requesting system can specify documents closely related to the first requested document. This enables only the function of the document requesting system acting as a WWW client to receive a suitable related document in advance without the function of the WWW server.

As described in detail until now, with the present invention, the client side can specify a document to be received in advance as a related document, which makes it possible to receive a suitable document in advance with only the function of the client.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A document requesting system for requesting a document providing system to transfer related documents, said document requesting system comprising:

an extracting unit configured to extract from a first document transferred by request an identifier specifying a second document linked with the first document;

a determining unit configured to determine a depth of link between the second document specified by said extracted identifier and a predetermined document as a reference, the second document being determined to be one of the related documents in a case where the depth of link is smaller than a specific value; and a requesting unit configured to request said document providing system to transfer the second document in the case where the depth of link is smaller than the specific value, wherein said determining unit includes a number-of-levels counter which counts a number of levels that indicates what level of hierarchy the second document falls from the predetermined document as the reference.

2. The system according to claim 1, wherein the second document is determined to be one of the related documents in a case where the number of levels indicated by said number-of-levels counter is smaller than a specific value.

3. A method of receiving related documents in advance for use in a document requesting system for requesting a document providing system to transfer the related documents, said method comprising:

extracting from a first document transferred by request an identifier specifying a second document linked with the first document;

determining a depth of link between the second document specified by said extracted identifier and a predetermined document as a reference, the second document being determined to be one of the related documents in a case where the depth of link is smaller than a specified value; and requesting said document providing system to transfer the second document in the case where the depth of link is smaller than the specific value, wherein said determining includes counting a number of levels that indicates what level of hierarchy the second document falls from the predetermined document as the reference.

4. The method according to claim 3, wherein the second document is determined to be one of the related documents in a case where the number of levels indicated by said number-of-levels counter is smaller than a specific value.

* * * * *